US 7,955,425 B2

(12) United States Patent
Koganehira et al.

(10) Patent No.: US 7,955,425 B2
(45) Date of Patent: Jun. 7, 2011

(54) INK COMPOSITION FOR INK JET RECORDING

(75) Inventors: Shuichi Koganehira, Matsumoto (JP); Hironori Sato, Shiojri (JP); Masashi Kamibayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/387,443

(22) Filed: May 1, 2009

(65) Prior Publication Data

US 2009/0308279 A1    Dec. 17, 2009

(30) Foreign Application Priority Data

May 1, 2008   (JP) .................. 2008-120025
Jan. 28, 2009 (JP) .................. 2009-016692

(51) Int. Cl.
*C09D 11/02* (2006.01)
(52) U.S. Cl. ............... 106/31.58; 106/31.59; 106/31.86; 106/31.89
(58) Field of Classification Search ............... 106/31.58, 106/31.86, 31.59, 31.89
See application file for complete search history.

(56) References Cited

U.S. PATENT DOCUMENTS

| | | | |
|---|---|---|---|
| 6,187,086 B1 | 2/2001 | Rehman | |
| 6,899,753 B2 * | 5/2005 | Leu et al. .................. | 106/31.58 |
| 7,517,399 B2 * | 4/2009 | Sato et al. .................. | 106/31.58 |
| 7,537,652 B2 * | 5/2009 | Koganehira et al. ....... | 106/31.58 |
| 7,604,692 B2 * | 10/2009 | Koganehira et al. ....... | 106/31.58 |
| 2003/0037700 A1 | 2/2003 | Leu et al. | |
| 2004/0186200 A1 * | 9/2004 | Yatake ......................... | 523/160 |
| 2005/0235870 A1 * | 10/2005 | Ishihara ..................... | 106/31.58 |
| 2007/0091156 A1 | 4/2007 | Jackson | |
| 2007/0159516 A1 * | 7/2007 | Sato et al. ..................... | 347/100 |
| 2007/0247504 A1 * | 10/2007 | Koganehira et al. .......... | 347/100 |
| 2008/0213548 A1 * | 9/2008 | Koganehira et al. ....... | 428/195.1 |

FOREIGN PATENT DOCUMENTS

| | | |
|---|---|---|
| EP | 1926785 A1 | 6/2008 |
| JP | 2000-239590 A | 9/2000 |
| JP | 2003-213179 | 7/2003 |
| JP | 2003-253167 | 9/2003 |
| JP | 2003-301129 A | 10/2003 |
| JP | 2005-194500 | 7/2005 |
| JP | 2005-307184 A | 11/2005 |
| JP | 2006-176622 A | 7/2006 |
| JP | 2006-249429 | 9/2006 |
| JP | 2006-257361 A | 9/2006 |
| JP | 2007-241158 | 9/2007 |
| JP | 2007-84807 A | 10/2008 |
| WO | 2007047787 A2 | 4/2007 |

OTHER PUBLICATIONS

International Search Report (International Application No. PCT/JP2009/001975) dated Aug. 11, 2009.

* cited by examiner

*Primary Examiner* — Jerry Lorengo
*Assistant Examiner* — Veronica Faison Gee
(74) *Attorney, Agent, or Firm* — Nutter McClennen & Fish LLP; John J. Penny, Jr.

(57) ABSTRACT

An ink composition that can form high-quality images free of white streaks and harshness on actual printing paper, such as art paper, even at low resolution and that can reduce the occurrence of curling even with thin actual printing paper having a low grammage is provided.

An ink jet printing ink composition includes at least a colorant, water, an alcohol solvent, and a surfactant, wherein the alcohol solvent contains a poorly water-soluble alkane diol, a water-soluble 1,2-alkane diol, and a water-soluble symmetrical alkane diol having a hydroxy group at both ends.

19 Claims, 1 Drawing Sheet

* IN THE GRAPH, THE VERTICAL AXIS REPRESENTS THE AMOUNT (g) OF ALCOHOL SOLVENT ADDED.

* IN THE GRAPH, THE VERTICAL AXIS REPRESENTS THE AMOUNT (g) OF ALCOHOL SOLVENT ADDED.

INK COMPOSITION FOR INK JET RECORDING

TECHNICAL FIELD

The present invention relates to an ink jet printing ink composition that can provide high-quality printed matter without uneven printing in various recording media, even in recording media having low water absorbency, such as synthetic paper and actual printing paper.

BACKGROUND ART

An ink jet printing method is a print process in which ink droplets are jetted and adhere to a recording medium, such as paper. With recent innovative advances in ink jet printing technology, an ink jet printing method has been used in the field of high-resolution printing, which was achieved only by silver halide photography or offset printing. Thus, an ink jet printing ink that can be used in ink jet printing to form glossy images equivalent to those of silver halide photography using high-gloss recording media, so-called special paper, comparable to photographic paper or art paper used in the field of silver halide photography or offset printing has been developed. Furthermore, even with plain paper, an ink jet printing ink that can achieve image quality equivalent to that of silver halide photography has been developed.

In recent years, with the spread of image forming technology using digital data, desktop publishing (DTP) has become increasingly common particularly in the field of printing. Even in printing in DTP, color proofs are prepared in advance to check the gloss and the color of an actual printed matter. An ink jet printing method has been used to output such proofs. Because color reproduction and stability reproduction of printed matter are required in DTP, special paper for ink jet printing is generally used as a recording medium.

Special paper for ink jet printing is designed to achieve gloss and color equivalent to those of outputs printed on actual printing paper. Thus, the quality of special paper is appropriately adjusted to the type of actual printing paper. However, manufacture of special paper corresponding to all types of actual printing paper will lead to high manufacturing costs. Thus, in color proof applications, there is a demand that ink jet printing be performed on actual printing paper rather than special paper. If proofs printed directly on actual printing paper rather than special paper by ink jet printing can be used as final proofs, proofreading costs can be reduced greatly. Synthetic paper formed of polyethylene resin or polyester resin blended with inorganic filler, widely used in the field of printing, has excellent recyclability and has received attention as an ecological material in recent years.

Actual printing paper is coated paper that includes a coated layer for receiving an oil-based ink on the surface thereof. However, the coated layer has a poor ink absorption ability. Water-based pigment ink, which is generally used in ink jet printing, therefore penetrates insufficiently into the recording medium (actual printing paper), causing blurring or uneven agglomeration in an image.

To address these problems, for example, Japanese Unexamined Patent Application Publication No. 2005-194500 (Patent Document 1) discloses a pigment ink that contains a polysiloxane compound as a surfactant and an alkane diol, such as 1,2-hexanediol, as a dissolution aid to reduce blurring and have a high gloss on special paper. Japanese Unexamined Patent Application Publications Nos. 2003-213179 (Patent Document 2), 2003-253167 (Patent Document 3), and 2006-249429 (Patent Document 4) propose that the addition of glycerin, a diol alcohol solvent, such as 1,3-butanediol, or a triol alcohol solvent, such as pentanetriol, to ink control the penetration of the ink to a recording medium, thus forming high-quality images.

In a previous patent application (Japanese Patent Application No. 2007-241158), the present inventors have proposed that the addition of a surfactant, such as polysiloxane, and a poorly water-soluble alkane diol, a water-soluble alkane diol, and an alkane triol as alcohol solvents to an ink provide high-quality images free of white streaks and harshness even in low-resolution printing on a recording medium having low liquid absorbency, such as actual printing paper.

PRIOR ART DOCUMENTS

Patent Documents

[Patent Document 1] Japanese Unexamined Patent Application Publication No. 2005-194500
[Patent Document 2] Japanese Unexamined Patent Application Publication No. 2003-213179
[Patent Document 3] Japanese Unexamined Patent Application Publication No. 2003-253167
[Patent Document 4] Japanese Unexamined Patent Application Publication No. 2006-249429

SUMMARY OF THE INVENTION

The present inventors have recently obtained findings that high-quality images free of white streaks and harshness can be formed even in low-resolution printing on a recording medium having low liquid absorbency, such as actual printing paper, by using an alcohol solvent that contains a poorly water-soluble alkane diol, a water-soluble alkane diol, and a water-soluble symmetrical alkane diol having a hydroxy group at both ends. The present invention relies on such findings.

Thus, it is an object of the present invention to provide an ink composition that can form high-quality images free of white streaks and harshness even in low-resolution printing on a recording medium having low liquid absorbency, such as actual printing paper.

An ink jet printing ink composition according to the present invention contains at least a colorant, water, an alcohol solvent, and a surfactant, wherein the alcohol solvent contains a poorly water-soluble alkane diol, a water-soluble 1,2-alkane diol, and a water-soluble symmetrical alkane diol having a hydroxy group at both ends.

The present invention provides an ink composition that can form high-quality images free of white streaks and harshness even in low-resolution printing on a recording medium having low liquid absorbency, such as actual printing paper.

SPECIFIC DESCRIPTION OF THE INVENTION

Figure 1:
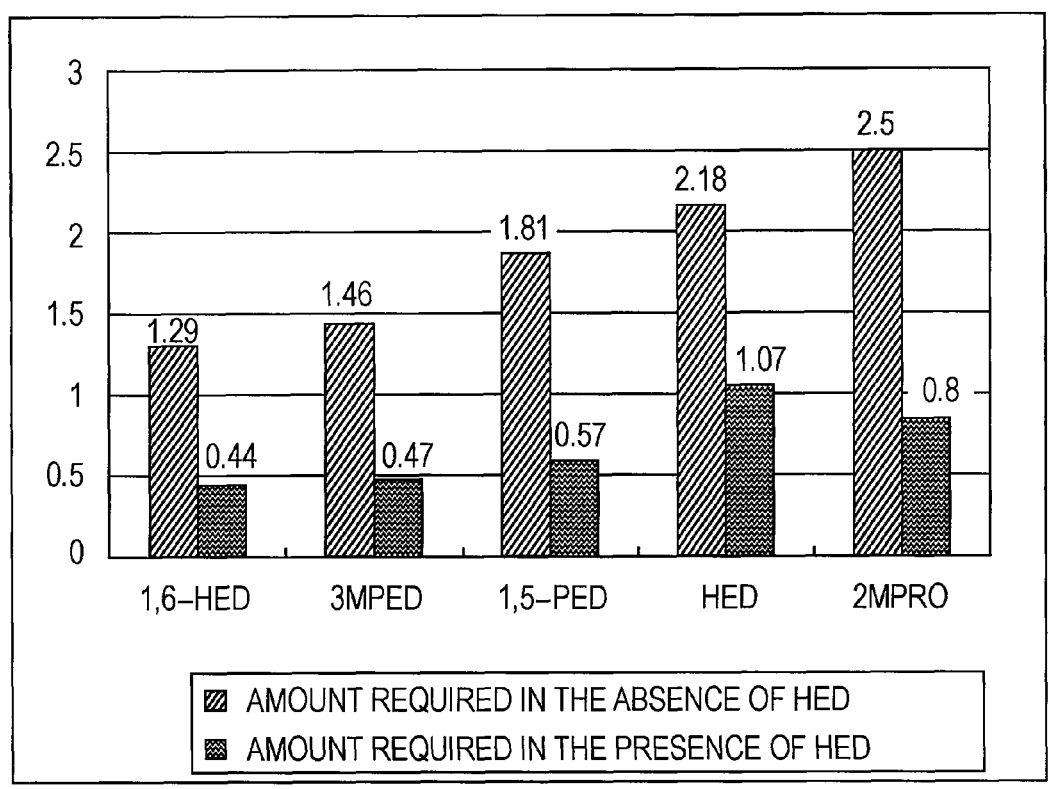
FIG. 1 is a graph of the solubility of 1,2-octanediol when alcohol solvents are added to an aqueous 1,2-octanediol solution.

An ink jet printing ink composition according to the present invention contains at least a colorant, water, an alcohol solvent, and a surfactant, wherein the alcohol solvent contains a poorly water-soluble alkane diol, a water-soluble 1,2-alkane diol, and a water-soluble symmetrical alkane diol having a hydroxy group at both ends. Each of the components will be described below.

DEFINITIONS

In the present specification, the alkane diol may have a straight chain or a branched chain.

The term "water-soluble" means that the solubility in water (the amount of solute per 100 g of water) at 20° C. is at least 10.0 g, and the term "poorly water-soluble" means that the solubility in water (the amount of solute per 100 g of water) is less than 1.0 g.

Alcohol Solvent

An alcohol solvent for use in an ink jet printing ink composition according to the present invention contains at least three organic solvents: a poorly water-soluble alkane diol, a water-soluble 1,2-alkane diol, and a water-soluble symmetrical alkane diol having a hydroxy group at both ends. The presence of these three alcohol solvents as essential components can provide an ink composition that is prevented from agglomeration in actual printing paper, in particular art paper, paper for POD applications (for example, Ricoh business coat gloss 100 manufactured by Ricoh Company, Ltd.), and laser printer paper (for example, LPCCTA4 manufactured by Seiko Epson Corporation) each having a relatively high ink absorption ability, that forms high-quality images free of white streaks and harshness even in low-resolution printing, and that has excellent ejection stability. The term "agglomeration", as used herein, refers to local unevenness in the density of related colors in printing of an area (for example, in printing of an area of six square inches in monochrome (which does not mean the number of ink colors)), but does not mean that part of a recording medium surface remains uncoated with ink. The term "white streak" refers to the absence of local unevenness in the color density of related colors in printing of an area (for example, in printing of an area of six square inches in monochrome) and the remaining of part of a recording medium surface not coated with ink as a streak in the moving direction of a print head. The term "harshness" or "defective filling-in" refers to the absence of local unevenness in the color density of related colors in printing of an area, as described above, and the remaining of part of a recording medium surface not coated with ink, exhibiting graininess.

In the present invention, with a recording medium as described above, even using thin actual printing paper having a grammage as low as 104.7 g/m$^2$ or less, the occurrence of inward bending, so-called curling, of the printed surface can be reduced.

The reason that the addition of a water-soluble symmetrical alkane diol having a hydroxy group at both ends, together with a poorly water-soluble alkane diol and a water-soluble 1,2-alkane diol, as an essential component can form high-quality images free of white streaks and harshness, as described above, is not clear, but is believed as described below.

Ink agglomeration in printing on actual printing paper occurs probably because ink dots have a high surface tension, have a large contact angle with respect to the surface of the actual printing paper, and are therefore repelled by the actual printing paper. Even when white streaks or defective filling-in occurs in low-resolution printing, ink agglomeration is reduced with a decrease in the surface tension of ink adhering to the surface of actual printing paper.

White streaks or defective filling-in in low-resolution printing occurs probably because ink dots adhering to the surface of actual printing paper come into contact with adjacent ink dots and spread over the surface, causing interactive flows of wet inks. These interactive ink flows probably result from the difference in the drying time of ink dots, which depends on the difference in the adhering time of adjacent ink dots and on the size of adhering droplets. Thus, to reduce ink agglomeration and form high-quality images free of white streaks and harshness even in low-resolution printing, ink adhering to actual printing paper preferably has low surface tension and low flowability.

However, the absence of a penetrating wetting agent to reduce the flowability of ink may accelerate the drying of ink dots adhering to the surface of actual printing paper and the absorption of ink to reduce the duration of time during which the adhering ink dots spread over the surface, thus causing white streaks or defective filling-in in low-resolution printing.

The water-soluble symmetrical alkane diol having a hydroxy group at both ends for use in the present invention is a viscous substance like glycerin. The water-soluble symmetrical alkane diol having a hydroxy group at both ends is a penetrating wetting agent that has a lower surface tension than glycerin. For example, a 10% aqueous solution of 2-methyl-1,3-propanediol has a surface tension of 57.5 mN/m, and a 10% aqueous solution of 3-methyl-1,5-butanediol has a surface tension of 45.8 mN/m.

A water-soluble symmetrical alkane diol having a hydroxy group at both ends that has such properties, in combination with the poorly water-soluble alkane diol and the water-soluble 1,2-alkane diol described above, also improves ejection stability. The ejection stability is improved with increasing number of carbon atoms of the symmetrical alkane diol having a hydroxy group at both ends.

The reason that the addition of the water-soluble symmetrical alkane diol having a hydroxy group at both ends, together with the poorly water-soluble alkane diol and the water-soluble 1,2-alkane diol, as an essential component can reduce the occurrence of curling in printing on thin actual printing paper is not clear, but is believed as described below. Since a water-soluble 1,2-alkane diol is a polar solvent and also functions as a film-forming aid for a resin, the water-soluble 1,2-alkane diol promotes the shrinkage of a resin contained in an ink adhering to a recording medium. At a low content of such a polar solvent, ink may have insufficient fixability to a recording medium. In contrast, since a water-soluble symmetrical alkane diol having a hydroxy group at both ends is a nonpolar solvent and inhibits the film formation of a resin, the water-soluble symmetrical alkane diol can reduce the shrinkage of a resin contained in ink. At an excessively high content of such a nonpolar solvent, ink may have insufficient fixability to a recording medium.

In the present invention, the poorly water-soluble alkane diol is preferably an alkane diol having at least seven, more preferably seven to ten, carbon atoms, for example, 1,2-heptanediol, 1,2-octanediol, 5-methyl-1,2-hexanediol, 4-methyl-1,2-hexanediol, or 4,4-dimethyl-1,2-pentanediol. Among others, 1,2-octanediol is more preferred.

The water-soluble 1,2-alkane diol is preferably an alkane diol having not more than six carbon atoms, for example, 1,2-hexanediol, 1,2-pentanediol, 1,2-butanediol, 4-methyl-1,2-pentanediol, or 3,3-dimethyl-1,2-butanediol. Among others, a water-soluble alkane diol a 15% aqueous solution of which has a surface tension of 28 mN/m or less is more preferred, and 1,2-hexanediol (surface tension: 26.7 mN/m), 4-methyl 1,2-pentanediol (surface tension: 25.4 mN/m), and 3,3-dimethyl-1,2-butanediol (surface tension: 26.1 mN/m)

are particularly preferred. In terms of offensive smell in printing, 1,2-hexanediol is preferred.

The water-soluble symmetrical alkane diol having a hydroxy group at both ends is preferably an alkane diol having at least 3, more preferably 4 to 6, carbon atoms in the main chain thereof. The water-soluble symmetrical alkane diol having a hydroxy group at both ends may have a branched chain. The term "symmetrical", as used herein in connection with an alkane diol having a hydroxy group at both ends of an alkyl chain thereof, refers to an alkane diol having a hydroxy group at both ends that has a symmetry plane equidistant from the hydroxy groups, as in 1,5-pentanediol. Examples of the water-soluble symmetrical alkane diol having a hydroxy group at both ends include 2-methyl-1,3-propanediol, 3-methyl-1,5-pentanediol, 1,5-pentanediol, and 1,6-hexanediol.

Among others, in terms of ejection stability, a water-soluble symmetrical alkane diol having a hydroxy group at both ends that has a large number of carbon atoms is preferably used. A water-soluble symmetrical alkane diol having a hydroxy group at both ends that has six carbon atoms, for example, 3-methyl-1,5-pentanediol or 1,6-hexanediol has a high ability to dissolve a poorly water-soluble alkane diol in water and therefore improves ejection stability. In particular, 1,6-hexanediol improves ejection stability, particularly dissolution of clogging in an ink jet printer.

In terms of handling in the manufacture of ink, the water-soluble symmetrical alkane diol having a hydroxy group at both ends is preferably in a liquid state at room temperature. For example, 1,5-pentanediol and 3-methyl-1,5-pentanediol are more preferable than relatively volatile 2-methyl-1,3-propanediol.

In the three alcohol solvents described above, the ratio of the content of the poorly water-soluble alkane diol to the content of the water-soluble 1,2-alkane diol preferably ranges from 6:1 to 1:3 and more preferably from 6:1 to 1:1. Within these ranges, the poorly water-soluble alkane diol can be stably dissolved in ink, and the ejection stability improves. When the proportion of the water-soluble 1,2-alkane diol increases beyond these ranges, it is difficult to achieve both a decrease in the initial viscosity of ink and a decrease in uneven aggregation. When the proportion of the water-soluble 1,2-alkane diol decreases below these ranges, it is difficult to stably dissolve the poorly water-soluble alkane diol in ink, and it is difficult to reduce time-dependent viscosity change and maintain storage stability.

The content of the poorly water-soluble alkane diol and the water-soluble symmetrical alkane diol having a hydroxy group at both ends preferably ranges from 1:1 to 1:18 and more preferably from 1:1 to 1:6. Within these ranges, the ejection stability of ink can be improved. When the proportion of the water-soluble symmetrical alkane diol having a hydroxy group at both ends increases beyond these ranges, the initial viscosity of ink increases, and the drying characteristics deteriorates. On the other hand, when the proportion of the water-soluble symmetrical alkane diol having a hydroxy group at both ends decreases below these ranges, the dissolution of clogging deteriorates, and accelerated drying reduces the duration of time during which ink spreads over the surface, preventing ink from covering a recording medium and thereby increasing the occurrence of white streaks.

The ratio of the content of the water-soluble 1,2-alkane diol to the content of the water-soluble symmetrical alkane diol having a hydroxy group at both ends preferably ranges from 1:2 to 1:12 and more preferably from 1:6 to 1:12. Within these ranges, in low-resolution printing on actual printing paper, the occurrence of white streaks and harshness can be reduced.

When the proportion of the water-soluble symmetrical alkane diol having a hydroxy group at both ends increases beyond these ranges, the initial viscosity of ink increases, and the drying characteristics deteriorates. On the other hand, when the proportion of the water-soluble symmetrical alkane diol having a hydroxy group at both ends decreases below these ranges, the dissolution of clogging deteriorates, and accelerated drying reduces the duration of time during which ink spreads over the surface, preventing ink from covering a recording medium and thereby increasing the occurrence of white streaks.

The content of the poorly water-soluble alkane diol preferably ranges from 1% to 3% by weight and more preferably from 1.5% to 2.5% by weight of an ink composition. At less than 1% by weight, uneven aggregation may occur in a recording medium having low ink absorbency, such as actual printing paper. On the other hand, at more than 3% by weight, the poorly water-soluble alkane diol may be incompletely dissolved in ink.

The content of the water-soluble 1,2-alkane diol preferably ranges from 0.5% to 3% by weight and more preferably from 0.5% to 2% by weight. At less than 0.5% by weight, the poorly water-soluble alkane diol may be insoluble in ink. On the other hand, at more than 3% by weight, the initial viscosity of ink may be unfavorably increased.

The content of the water-soluble symmetrical alkane diol having a hydroxy group at both ends preferably ranges from 1% to 6% by weight of an ink composition. At less than 1% by weight, the ejection stability may be insufficient. On the other hand, at more than 6% by weight, the initial viscosity of ink increases, and the ejection stability may be insufficient.

In the present invention, the total content of the poorly water-soluble alkane diol and the water-soluble 1,2-alkane diol is preferably 6% by weight or less of an ink composition. Within this range, in a recording medium having low ink absorbency, such as actual printing paper, uneven aggregation does not occur, and the ejection stability is also excellent.

In the present invention, the total content of the poorly water-soluble alkane diol and the water-soluble symmetrical alkane diol having a hydroxy group at both ends is preferably 21% by weight or less of an ink composition. Within this range, in a recording medium having low ink absorbency, such as actual printing paper, uneven aggregation does not occur, the ejection stability is excellent, and the occurrence of curling is reduced.

Colorant

Colorants for use in an ink jet printing ink composition according to the present invention may be dyes or pigments, and pigments are suitably used in terms of light resistance and water resistance.

Pigments may be inorganic pigments or organic pigments, which are used alone or in combination. Examples of inorganic pigments include titanium oxide, iron oxide, and carbon black manufactured by known methods, such as a contact method, a furnace method, and a thermal method. Examples of organic pigments include azo pigments (including azo lake, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, thioindigo pigments isoindolinone pigments, and quinophralone pigments), dye chelates (for example, basic dye chelates and acidic dye chelates), nitro pigments, nitroso pigments, and aniline black.

Specific examples of pigments will be described below for the type (color) of an ink composition of interest. Examples of pigments for yellow ink compositions include C. I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185, which are used alone or in combination. Among others, one or at least two selected from the group consisting of C. I. Pigment Yellow 74, 110, 128, and 147 are preferably used. Examples of pigments for magenta ink compositions include C. I. Pigment Red 5, 7, 12, 48 (Ca), 48 (Mn), 57 (Ca), 57:1, 112, 122, 123, 168, 184, 202, and 209 and C. I. Pigment Violet 19, which are used alone or in combination. Among others, one or at least two selected from the group consisting of C. I. Pigment Red 122, 202, and 209 and C. I. Pigment Violet 19 are preferably used. Examples of pigments for cyan ink compositions include C. I. Pigment Blue 1, 2, 3, 15:3, 15:4, 15:34, 16, 22, and 60 and C. I. Vat Blue 4 and 60, which are used alone or in combination. In particular, C. I. Pigment Blue 15:3 and/or 15:4 are preferably used. Among others, C. I. Pigment Blue 15:3 is preferably used.

Examples of pigments for use in black ink compositions include carbons, such as lampblack (C. I. Pigment Black 6), acetylene black, furnace black (C. I. Pigment Black 7), channel black (C. I. Pigment Black 7), and carbon black (C. I. Pigment Black 7), inorganic pigments, such as iron oxide pigments, and organic pigments, such as aniline black (C. I. Pigment Black 1). In the present invention, carbon black is preferably used. More specifically, carbon black includes #2650, #2600, #2300, #2200, #1000, #980, #970, #966, #960, #950, #900, #850, MCF-88, #55, #52, #47, #45, #45L, #44, #33, #32, and #30 (all manufactured by Mitsubishi Chemical Co.), SpecialBlaek 4A and 550, Printex 95, 90, 85, 80, 75, 45, and 40 (all manufactured by Degussa AG), Regal 660, Rmogul L, and monarch 1400, 1300, 1100, 800, and 900 (all manufactured by Cabot Corporation), Raven 7000, 5750, 5250, 3500, 3500, 2500ULTRA, 2000, 1500, 1255, 1200, 1190ULTRA, 1170, and 1100ULTRA, and Raven 5000UIII (all manufactured by Columbian Chemicals Co.).

Since the pigment concentration (content) may be appropriately adjusted in the preparation of an ink composition, the pigment concentration is not limited to a particular value. In the present invention, the pigment solid concentration is preferably at least 9% by weight and more preferably at least 12% by weight. After ink droplets adhere to a recording medium, ink spreads over the recording medium surface. At a pigment solid concentration of 9% by weight or more, after ink spreads over the recording medium surface, ink immediately loses its flowability. Thus, in low-resolution printing on a recording medium, such as actual printing paper, blurring can be further reduced. That is, use of a combination of three particular alcohol solvents described above allows ink to be spread even over a recording medium having low ink absorbency. In addition, the solid concentration of ink can be increased to reduce the flowability of the ink on a recording medium, thereby preventing blurring. In particular, the effect of preventing blurring is noticeable at the boundary between a portion to which a large amount of ink adheres and a portion to which a small amount of ink adheres on a recording medium.

Preferably, the pigment is previously kneaded with a dispersing agent described below to satisfy the gloss of images, bronzing prevention, and the storage stability of an ink composition and to form more glossy color images.

Dispersing Agent

Preferably, an ink composition according to the present invention contains at least one resin selected from the group consisting of a styrene-acrylic acid copolymer resin, an oxyethyl acrylate resin, a urethane resin, and a fluorene resin as a dispersing agent for dispersing a colorant. These copolymer resins adsorb to pigment and improve dispersibility.

Specific examples of a hydrophobic monomer for use in the copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-dimethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, vinyltoluene, and hydroxyethylated orthophenylphenol acrylate. These monomers may be used alone or in combination.

Specific examples of a hydrophilic monomer include acrylic acid, methacrylic acid, maleic acid, and itaconic acid.

Preferably, the copolymer resin between a hydrophobic monomer and a hydrophilic monomer is at least one selected from the group consisting of a styrene-(meth)acrylic acid copolymer resin, a styrene-methylstyrene-(meth)acrylic acid copolymer resin, a styrene-maleic acid copolymer resin, a (meth)acrylic acid-(meth)acrylate copolymer resin, a styrene-(meth)acrylic acid-(meth)acrylate copolymer resin, and a hydroxyethylated orthophenylphenol acrylate-(meth) acrylic acid copolymer resin to satisfy the gloss of color images, bronzing prevention, and the storage stability of an ink composition and to form more glossy color images.

The copolymer resin may be a resin that contains a polymer produced by the reaction between styrene and acrylic acid or acrylate (styrene-acrylic acid resin). Alternatively, the copolymer resin may be a water-soluble acrylic acid resin. Alternatively, the copolymer resin may be a sodium, potassium, ammonium, triethanolamine, triisopropanolamine, triethylamine, or diethanolamine salt of the resin described above.

The acid value of the copolymer resin preferably ranges from 50 to 320 and more preferably from 100 to 250 to satisfy the gloss of color images, bronzing prevention, and the storage stability of an ink composition and to form more glossy color images.

The weight-average molecular weight (Mw) of the copolymer resin preferably ranges from 2,000 to 30,000 and more preferably from 2,000 to 20,000 to satisfy the gloss of color images, bronzing prevention, and the storage stability of an ink composition and to form more glossy color images.

The glass transition temperature (Tg, as determined by JIS K 6900) of the copolymer resin is preferably at least 30° C. and more preferably ranges from 50° C. to 130° C. to satisfy the gloss of color images, bronzing prevention, and the storage stability of an ink composition and to form more glossy color images.

The content of the copolymer resin preferably ranges from 20 to 50 parts by weight and more preferably from 20 to 40 parts by weight per 100 parts by weight of the pigment to satisfy the gloss of color images, bronzing prevention, and the storage stability of an ink composition and to form more glossy color images.

In the present invention, an oxyethyl acrylate resin may be used as the copolymer resin. Use of the oxyethyl acrylate resin results in a reduced initial viscosity of ink, excellent storage stability at high temperature, and enhanced dissolution of clogging, and is therefore more preferred.

The oxyethyl acrylate resin is preferably, but not limited to, a compound having the following formula (I). For example, the compound having the following formula is a resin that contains, on the basis of monomer molar ratio, 45% to 55% ortho-hydroxyethylated phenylphenol acrylate (CAS No. 72009-86-0), 20% to 30% acrylic acid (CAS No. 79-10-7), and 20% to 30% methacrylic acid (CAS No. 79-41-4). These may be used alone or in combination. The monomer composition is preferably, but not limited to, 70% to 85% ortho-hydroxyethylated phenylphenol acrylate (CAS No. 72009-86-0), 5% to 15% acrylic acid (CAS No. 79-10-7), and 10% to 20% methacrylic acid (CAS No. 79-41-4).

[Formula 1]

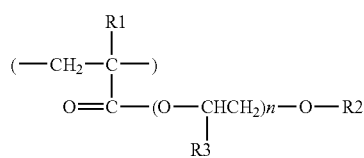

(wherein R1 and/or R3 is a hydrogen atom or a methyl group, R2 is an alkyl or aryl group, and n is an integer of at least one.)

Preferably, the compound having the formula (I) may be nonylphenoxypolyethylene glycol acrylate or polypropylene glycol #700 acrylate.

The content of the oxyethyl acrylate resin preferably ranges from 10 to 40 parts by weight and more preferably from to 25 parts by weight per 100 parts by weight of the pigment to satisfy both the initial viscosity of an ink composition and the storage stability of the ink composition, reduce uneven aggregation, and form color images with excellent filling-in.

The total percentage of resins derived from a monomer having a hydroxy group selected from the group consisting of acrylic acid and methacrylic acid in the oxyethyl acrylate resin preferably ranges from 30% to 70% and more preferably from 40% to 60% to satisfy both the initial viscosity of an ink composition and the storage stability of the ink composition and in terms of the dissolution of clogging.

The number-average molecular weight (Mn) of the oxyethyl acrylate resin before crosslinking preferably ranges from 4000 to 9000 and more preferably from 5000 to 8000 to satisfy both the initial viscosity of an ink composition and the storage stability of the ink composition. For example, Mn is measured with GPC (gel permeation chromatography).

The oxyethyl acrylate resin may be adsorbed on or detached from pigment in pigment dispersion. The maximum particle size of the copolymer resin is preferably 0.3 μm or less, and the average particle size is more preferably 0.2 μm or less (still more preferably 0.1 μm or less) to satisfy the gloss of color images, bronzing prevention, and the storage stability of an ink composition and to form more glossy color images. The average particle size is the mean diameter of actually dispersed pigment particles (cumulative 50% diameter) in dispersion and can be measured, for example, with Microtrac UPA (Microtrac Inc.).

The content of the oxyethyl acrylate resin preferably ranges from 20 to 50 parts by weight and more preferably from 20 to 40 parts by weight per 100 parts by weight of the pigment to satisfy the gloss of color images, bronzing prevention, and the storage stability of an ink composition and to form more glossy color images.

The content of the oxyethyl acrylate resin preferably ranges from 20 to 50 parts by weight and more preferably from 20 to 40 parts by weight per 100 parts by weight of the pigment to satisfy the gloss of color images, bronzing prevention, and the storage stability of an ink composition and to form more glossy color images.

In the present invention, a urethane resin can be used as a fixable pigment dispersant to satisfy the gloss of color images, bronzing prevention, and the storage stability of an ink composition and form more glossy color images. While a urethane resin is a resin that contains a polymer produced by the reaction between a diisocyanate compound and a diol compound, the urethane resin is preferably a resin that has a urethane bond and/or an amide bond and an acidic group in the present invention.

Examples of the diisocyanate compound include araliphatic diisocyanate compounds, such as hexamethylene diisocyanate and 2,2,4-trimethylhexamethylene diisocyanate, aromatic diisocyanate compounds, such as tolylene diisocyanate and phenylmethane diisocyanate, and modified compounds thereof.

Examples of the diol compound include polyethers, such as polyethylene glycol and polypropylene glycol, polyesters, such as poly(ethylene adipate) and poly(butylene adipate), and polycarbonates.

The acid value of the urethane resin preferably ranges from 10 to 300 and more preferably from 20 to 100 to satisfy the gloss of color images, bronzing prevention, and the storage stability of an ink composition and to form more glossy color images. The acid value is the amount of KOH (mg) required to neutralize 1 g of resin.

The weight-average molecular weight (Mw) of the urethane resin before crosslinking preferably ranges from 100 to 200,000 and more preferably from 1,000 to 50,000 to satisfy the gloss of color images, bronzing prevention, and the storage stability of an ink composition and to form more glossy color images. For example, Mw is measured with GPC (gel permeation chromatography).

The glass transition temperature (Tg, as determined by JIS K 6900) of the urethane resin preferably ranges from −50° C. to 200° C. and more preferably ranges from −50° C. to 100° C. to satisfy the gloss of color images, bronzing prevention, and the storage stability of an ink composition and to form more glossy color images.

Preferably, the urethane resin has a carboxyl group.

The content of the urethane resin preferably ranges from 20 to 50 parts by weight and more preferably from 20 to 40 parts by weight per 100 parts by weight of the pigment to satisfy the gloss of color images, bronzing prevention, and the storage stability of an ink composition and to form more glossy color images.

In the present invention, a fluorene resin may also be used as a fixable pigment dispersant. Use of the fluorene resin results in a reduced initial viscosity of ink, excellent storage stability at high temperature, and excellent fixability to actual printing paper, and is therefore more preferred.

The fluorene resin may be any resin having a fluorene skeleton and can be manufactured by copolymerization of monomer units such as those described below.
Cyclohexane, 5-isocyanate-1-(isocyanatemethyl)-1,3,3-trimethyl (CAS No. 4098-71-9)
Ethanol, 2,2-[9H-fluorene-9-ylidenebis(4,1-phenyleneoxy)] bis(CAS No. 117344-32-8)
Propionic acid, 3-hydroxy-2-(hydroxymethyl)-2-methyl (CAS No. 4767-03-7)
Ethanamine, N,N-diethyl-(CAS No. 121-44-8)

The fluorene resin is not limited, and, for example, the monomer composition is preferably, but not limited to, 35% to 45% CAS No. 4098-71-9, 40% to 50% CAS No. 117344-32-8, 5% to 15% CAS No. 4767-03-7, and 5% to 10% CAS No. 121-44-8.

The number-average molecular weight (Mn) of the fluorene resin before crosslinking preferably ranges from 2000 to 5000 and more preferably from 3000 to 4000 to satisfy both the initial viscosity of an ink composition and the storage stability of the ink composition. For example, Mn is measured with GPC (gel permeation chromatography).

The content of the fluorene resin preferably ranges from 20 to 50 parts by weight and more preferably from 20 to 40 parts by weight per 100 parts by weight of the pigment to satisfy the fixability of color images, bronzing prevention, and the storage stability of an ink composition and to form color images having better fixability.

The copolymer resin and the fixable pigment dispersing resin may be adsorbed on or detached from pigment in pigment dispersion. The maximum particle size of the copolymer resin is preferably 0.3 μm or less, and the average particle size is more preferably 0.2 μm or less (still more preferably 0.1 μm or less) to satisfy the gloss of color images, bronzing prevention, and the storage stability of an ink composition and to form more glossy color images. The average particle size is the mean diameter of actually dispersed pigment particles (cumulative 50% diameter) in dispersion and can be measured, for example, with Microtrac UPA (Microtrac Inc.).

The weight ratio (the former/the latter) of the copolymer resin to the fixable pigment dispersing resin (urethane resin and fluorene resin) preferably ranges from 1/2 to 2/1 and, to satisfy the gloss of color images, bronzing prevention, and the storage stability of an ink composition and to form more glossy color images, more preferably ranges from 1/1.5 to 1.5/1.

The weight ratio (the former/the latter) of the pigment solid content to the solid content other than the pigment preferably ranges from 100/40 to 100/80 to satisfy the gloss of color images, bronzing prevention, and the storage stability of an ink composition and to form more glossy color images.

The total amount of the copolymer resin and the fixable pigment dispersing resin is preferably 90 parts by weight or less (more preferably 70 parts by weight or less) per 100 parts by weight of the pigment to satisfy the gloss of color images, bronzing prevention, and the storage stability of an ink composition and to form more glossy color images.

A surfactant may be used as the dispersing agent. Examples of the surfactant include anionic surfactants, such as fatty acid salts, higher alkyl dicarboxylates, higher alcohol sulfuric acid ester salts, higher alkyl sulfonates, condensates of higher fatty acids and amino acids, sulfosuccinic acid ester salts, naphthenates, liquid fatty oil sulfuric acid ester salts, and alkylallyl sulfonates; cationic surfactants, such as fatty acid amine salts, quaternary ammonium salts, sulfonium salts, and phosphonium; and nonionic surfactants, such as polyoxyethylene alkyl ethers, polyoxyethylene alkyl esters, sorbitan alkyl esters, and polyoxyethylene sorbitan alkyl esters. It goes without saying that the surfactant added to an ink composition also functions as a surfactant.

Surfactant

An ink jet printing ink composition according to the present invention contains a surfactant as an essential component. Use of a surfactant for a recording medium coated with a resin for receiving ink allows excellent glossy images to be formed even on recording media in which the gloss is more important, such as photographic paper. Among others, like actual printing paper, even in recording media that include a surface receptor layer having a coated layer for receiving an oil-based ink, blurring (bleeding) between colors can be prevented, and whitening due to reflected light generated with an increase in the quantity of adhered ink can be prevented.

Organopolysiloxane surfactants are suitably used as surfactants for use in the present invention and increase wettability to the surface of a recording medium in the formation of recorded images, thus improving ink penetration. When an organopolysiloxane surfactant is used, the three alcohol solvents described above improve the solubility of the surfactant in ink, thus reducing the occurrence of insoluble matter. An ink composition having excellent ejection stability can therefore be provided.

The surfactants described above may be commercially available surfactants, for example, Olfin (trade name) PD-501 (manufactured by Nissin Chemical Industry Co., Ltd.), Olfin (trade name) PD-502 (manufactured by Nissin Chemical Industry Co., Ltd.), and Olfin (trade name) PD-570 (manufactured by Nissin Chemical Industry Co., Ltd.).

More preferably, the organopolysiloxane surfactant contains one or at least two compounds having the following formula (I):

[Formula 2]

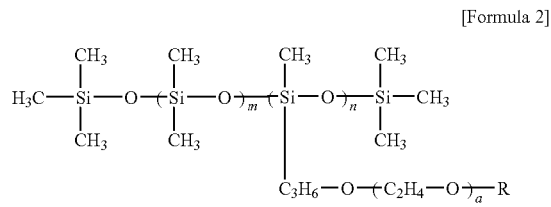

(wherein R denotes a hydrogen atom or a methyl group, a denotes an integer in the range of 2 to 11, m denotes an integer in the range of 2 to 50, and n denotes an integer in the range of 1 to 5.)
or contains one or at least two compounds having the formula (I) in which R denotes a hydrogen atom or a methyl group, a denotes an integer in the range of 2 to 13, m denotes an integer in the range of 2 to 50, and n denotes an integer in the range of 1 to 5. More preferably, the organopolysiloxane surfactant contains one or at least two compounds having the formula (I) in which R denotes a hydrogen atom or a methyl group, a denotes an integer in the range of 2 to 13, m denotes an integer in the range of 2 to 50, and n denotes an integer in the range of 1 to 8. More preferably, the organopolysiloxane surfactant contains one or at least two compounds having the formula (I) in which R denotes a methyl group, a denotes an integer in the range of 6 to 18, m is 0, and n is 1. Use of such particular organopolysiloxane surfactants further improves the uneven aggregation of ink even in printing on a recording medium of actual printing paper.

Among the compounds having the formula (I), a compound in which a denotes an integer in the range of 2 to 5, m denotes an integer in the range of 20 to 40, and n denotes an integer in the range of 2 to 4, a compound in which a denotes an integer in the range of 7 to 11, m denotes an integer in the range of 30 to 50, and n denotes an integer in the range of 3 to 5, a compound in which a denotes an integer in the range of 9 to 13, m denotes an integer in the range of 2 to 4, and n denotes an integer of 1 or 2, or a compound in which a denotes an integer in the range of 6 to 10, m denotes an integer in the range of 10 to 20, and n denotes an integer in the range of 4 to 8 is more preferably used. Use of such compounds can further improve the uneven aggregation of ink. For example, the surfactant contains a mixture of a compound having the formula (I) in which R denotes a methyl group, a denotes an integer in the range of 9 to 13, m denotes an integer in the range of 2 to 4, and n denotes an integer of 1 or 2 and a compound having the formula (I) in which R denotes a hydrogen atom, a denotes an integer in the range of 7 to 11, m denotes an integer in the range of 30 to 50, and n denotes an integer in the range of 3 to 5.

Still more preferably, a compound having the formula (I) in which R denotes a hydrogen atom, a denotes an integer in the range of 2 to 5, m denotes an integer in the range of 20 to 40, and n denotes an integer in the range of 2 to 4 or a compound having the formula (I) in which a denotes an integer in the range of 7 to 11, m denotes an integer in the range of to 50, and n denotes an integer in the range of 3 to 5 is used. Use of such compounds can further improve the uneven aggregation and blurring of ink.

Still more preferably, a compound having the formula (I) in which R denotes a methyl group, a denotes an integer in the range of 9 to 13, m denotes an integer in the range of 2 to 4, and n denotes an integer of 1 or 2 or a compound having the formula (I) in which a denotes an integer in the range of 6 to 10, m denotes an integer in the range of 10 to 20, and n denotes an integer in the range of 4 to 8 is used. Use of such compounds can further improve the uneven aggregation and blurring of ink.

Still more preferably, a compound having the formula (I) in which R denotes a methyl group, a denotes an integer in the range of 6 to 12, m is 0, and n is 1 is used. Use of such compounds can further improve the uneven aggregation and blurring of ink.

Most preferably, a mixture of a compound having the formula (I) in which R denotes a hydrogen atom, a denotes an integer in the range of 7 to 11, m denotes an integer in the range of 30 to 50, and n denotes an integer in the range of 3 to 5, a compound having the formula (I) in which R denotes a methyl group, a denotes an integer in the range of 9 to 13, m denotes an integer in the range of 2 to 4, and n denotes an integer of 1 or 2, and a compound having the formula (I) in which R denotes a methyl group, a denotes an integer in the range of 6 to 10, m denotes an integer in the range of 10 to 20, and n denotes an integer in the range of 4 to 8 is used. Use of such compounds can further improve the uneven aggregation and blurring of ink.

An ink composition according to the present invention preferably contains 0.01% to 1.0% by weight, more preferably 0.05% to 0.50% by weight, of the surfactant. In particular, the content of a surfactant in which R is a methyl group is preferably larger than the content of a surfactant in which R is H.

Another surfactant, more specifically, an acetylene glycol surfactant, an anionic surfactant, a nonionic surfactant, or an amphoteric surfactant may be added to an ink composition according to the present invention.

Examples of the acetylene glycol surfactant include 2,4,7,9-tetramethyl-5-decyne-4,7-diol, 3,6-dimethyl-4-octyne-3,6-diol, 3,5-dimethyl-1-hexyne-3ol, and 2,4-dimethyl-5-hexyne-3-ol. The acetylene glycol surfactant may also be a commercial product, for example, Olfin (trade name) E1010, STG, Y (trade name, manufactured by Nissin Chemical Industry Co., Ltd.), or Surfynol 61, 104, 82, 465, 485, or TG (trade name, manufactured by Air Products and Chemicals Inc.).

Water and Other Components

An ink jet printing ink composition according to the present invention contains the particular alcohol solvents and the surfactant(s) described above, other various additive agents, and water as a solvent. Preferably, water is pure or ultrapure water, such as ion-exchanged water, ultrafiltered water, reverse osmosis water, or distilled water. In particular, water sterilized, for example, by ultraviolet irradiation or the addition of hydrogen peroxide is free from mold or bacterium for a long period of time and is therefore preferred.

Preferably, in addition to the components described above, an ink composition according to the present invention contains a penetrant.

Glycol ethers are suitably used as penetrants.

Specific examples of glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol, which are used alone or as a mixture thereof.

Among the glycol ethers described above, alkyl ethers of polyhydric alcohols are preferred, and ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, triethylene glycol monomethyl ether, triethylene glycol monoethyl ether, and triethylene glycol mono-n-butyl ether are particularly preferred. Triethylene glycol mono-n-butyl ether is more preferred.

The amount of the penetrant may be determined appropriately and preferably ranges from about 0.1% to 30% by weight and more preferably from about 1% to 20% by weight.

Preferably, in addition to the components described above, an ink composition according to the present invention contains a recording medium solubilizer.

Pyrrolidones, such as N-methyl-2-pyrrolidone, are suitably used as the recording medium solubilizer. The amount of the recording medium solubilizer may be determined appropriately and preferably ranges from about 0.1% to 30% by weight and more preferably from about 1% to 20% by weight.

Preferably, an ink jet printing ink composition according to the present invention is substantially free from a wetting agent. Since a wetting agent prevents ink from being dried and solidified, for example, in an ink jet nozzle, ink dropped on synthetic paper having particularly low ink absorbency may remain wet. This may cause a problem in high-speed printing. When an ink containing a wetting agent is used, while the ink is not absorbed and remains on the recording medium surface, the subsequent ink adheres to the recording medium. This may cause uneven aggregation. Thus, in the present invention, when such a recording medium having particularly low ink absorbency is used, preferably, the ink composition is substantially free from a wetting agent. Even when ink is solidified in an ink jet nozzle, a solution containing a wetting agent may be applied to redissolve the solidified ink.

In particular, in the present invention, preferably, the ink composition is substantially free from a wetting agent having a vapor pressure of 2 mPa or less at 25° C. The phrase "substantially free from" means that the amount of wetting agent is less than 1% by weight of an ink composition.

When the content of a wetting agent having a vapor pressure of 2 mPa or less at 25° C. is less than 1% by weight of ink, not only recording media having low ink absorbency, such as actual printing paper, but also metals or plastics that do not absorb ink can be printed by an ink jet printing method. Although it is apparent to a person skilled in the art that part of the penetrating solvents described above also act as wetting agents, the penetrating solvents are not included in the wetting agent in the present specification. In the present specification, the alcohol solvents described above are also not included in the wetting agent.

Examples of the wetting agent include wetting agents for use in general ink jet printing inks and more specifically include glycerin, ethylene glycol, diethylene glycol, triethylene glycol, propylene glycol, trimethylolpropane, trimethylolmethane, and trimethylolethane. When a recording medium is actual printing paper having particularly low ink absorbency, the wetting agent can be appropriately added.

An ink composition according to the present invention may further contain an agent to prevent nozzle clogging, a preservative, an antioxidant, an electric conductivity modifier, a pH adjusting agent, a viscosity modifier, a surface tension modifier, and an oxygen absorbent.

Examples of the preservative and fungicide include sodium benzoate, pentachlorophenol sodium, 2-pyridinethiol-1-oxide sodium, sodium sorbate, sodium dehydroacetate, and 1,2-dibenzinethiazoline-3-one (Proxel CRL, Proxel BND, Proxel GXL, Proxel XL-2, and Proxel TN manufactured by ICI).

Examples of the pH adjusting agent, dissolution aid, or antioxidant include amines, such as diethanolamine, triethanolamine, propanolamine, and morpholine, modified compounds thereof, inorganic salts, such as potassium hydroxide, sodium hydroxide, and lithium hydroxide, ammonium hydroxide, quaternary ammonium hydroxide (tetramethylammonium etc.), carbonates, such as potassium carbonate, sodium carbonate, and lithium carbonate, phosphates, N-methyl-2-pyrrolidone, ureas, such as urea, thiourea, and tetramethylurea, allophanates, such as allophanate and methyl allophanate, biurets, such as biuret, dimethylbiuret, and tetramethylbiuret, and L-ascorbic acid and its salts.

An ink composition according to the present invention may contain an antioxidant and an ultraviolet absorber. Examples of the antioxidant and the ultraviolet absorber include Tinuvin 328, 900, 1130, 384, 292, 123, 144, 622, 770, and 292, Irgacor 252 153, Irganox 1010, 1076, 1035, and MD1024, manufactured by Chiba Specialty Chemicals Co., Ltd., and lanthanide oxides.

An ink composition according to the present invention can be manufactured by dispersing and mixing the components described above by an appropriate method. Preferably, first, a pigment, a polymer dispersant, and water are mixed in an appropriate dispersing apparatus (for example, a ball mill, a sand mill, an attritor, a rolling mill, an agitator mill, a Henschel mixer, a colloid mill, an ultrasonic homogenizer, a jet mill, or Angmill (trade name)) to prepare homogeneous pigment dispersion, and a resin (resin emulsion) prepared separately, water, a water-soluble organic solvent, a sugar, a pH preparation agent, a preservative, and a fungicide are then sufficiently dissolved in the dispersion to prepare an ink solution. After being stirred sufficiently, the ink solution is filtered to remove coarse particle sizes and foreign substances responsible for clogging, thus yielding an intended ink composition.

Ink Jet Printing Method

In an ink jet printing method according to the present invention, droplets of the ink composition described above are discharged to adhere to a recording medium for printing. In a printing method according to the present invention, synthetic paper or actual printing paper is preferably used as a recording medium. In particular, even in low-resolution printing on art paper, high-quality paper for POD (print-on-demand) applications, and special paper for laser printers, high-quality images free of white streaks and harshness can be formed. Examples of the high-quality paper for POD applications include Ricoh business coat gloss 100 (manufactured by Ricoh Company, Ltd.). Examples of special paper for laser printers include LPCCTA4 (manufactured by Seiko Epson Corporation).

EXAMPLES

The present invention will be described in detail in the following examples. However, these examples do not limit the present invention.

Preparation of Ink Composition

Components shown in the following Table 1 were mixed and filtered through a 10 μm membrane filter to prepare inks. A styrene-acrylate resin in the table is a copolymer having a molecular weight of 1600 and an acid value of 150. A urethane resin is a copolymer having a molecular weight of 6000 and an acid value of 50. A fluorene resin contains about 50% by weight of monomer having a fluorene skeleton of CAS No. 117344-32-8 and has a molecular weight of 3300. A surfactant used is an organopolysiloxane surfactant and contains a mixture of a compound having the formula (I) in which R denotes a methyl group, a denotes an integer in the range of 9 to 13, m denotes an integer in the range of 2 to 4, and n denotes an integer of 1 or 2 and a compound having the formula (I) in which R denotes a hydrogen atom, a denotes an integer in the range of 7 to 11, m denotes an integer in the range of to 50, and n denotes an integer in the range of 3 to 5.

TABLE 1

| Composition | | Example 1 Ink set 1 | | | | Example 2 Ink set 2 | | | |
|---|---|---|---|---|---|---|---|---|---|
| | | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |

TABLE 1-continued

| | Composition | | | | | | | | |
|---|---|---|---|---|---|---|---|---|---|
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | 1 | 1 | 1 | 1 | 3 | 3 | 3 | 3 |
| | 1,6-hexanediol | — | — | — | — | — | — | — | — |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water Balance | Balance 100 | Balance 100 | Balance 100 | Balance 100 | Balance 100 | Balance 100 | Balance 100 | Balance 100 |

| | | Example 3 Ink set 3 | | | | Example 4 Ink set 4 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | 18 | 18 | 18 | 18 | 6 | 6 | 6 | 6 |
| | 1,6-hexanediol | — | — | — | — | — | — | — | — |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water Balance | Balance 100 | Balance 100 | Balance 100 | Balance 100 | Balance 100 | Balance 100 | Balance 100 | Balance 100 |

TABLE 2

| | | Example 5 Ink set 5 | | | | Example 6 Ink set 6 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | 1 | 1 | 1 | 1 | 3 | 3 | 3 | 3 |
| | 1,6-hexanediol | — | — | — | — | — | — | — | — |
| | 1,2-hexanediol | 3 | 3 | 3 | 3 | 3 | 3 | 3 | 3 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water Balance | Balance 100 | Balance 100 | Balance 100 | Balance 100 | Balance 100 | Balance 100 | Balance 100 | Balance 100 |

TABLE 2-continued

|  | Composition | Example 7 Ink set 7 | | | | Example 8 Ink set 8 | | | |
|---|---|---|---|---|---|---|---|---|---|
|  |  | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
|  | Urethane resin | — | — | — | — | — | — | — | — |
|  | Fluorene resin | — | — | — | — | — | — | — | — |
| Alcohol solvent | 3-methyl-1,5-pentanediol | 18 | 18 | 18 | 18 | 6 | 6 | 6 | 6 |
|  | 1,6-hexanediol | — | — | — | — | — | — | — | — |
|  | 1,2-hexanediol | 3 | 3 | 3 | 3 | 3 | 3 | 3 | 3 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

TABLE 3

|  | Composition | Example 9 Ink set 9 | | | | Example 10 Ink set 10 | | | |
|---|---|---|---|---|---|---|---|---|---|
|  |  | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
|  | Urethane resin | 2.4 | 2.4 | 2.4 | 4.8 | 2.4 | 2.4 | 2.4 | 4.8 |
|  | Fluorene resin | — | — | — | — | — | — | — | — |
| Alcohol solvent | 3-methyl-1,5-pentanediol | 1 | 1 | 1 | 1 | 3 | 3 | 3 | 3 |
|  | 1,6-hexanediol | — | — | — | — | — | — | — | — |
|  | 1,2-hexanediol | 0.5 | 0.5 | 0.5 | 0.5 | 0.5 | 0.5 | 0.5 | 0.5 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

|  | Composition | Example 11 Ink set 11 | | | | Example 12 Ink set 12 | | | |
|---|---|---|---|---|---|---|---|---|---|
|  |  | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
|  | Urethane resin | 2.4 | 2.4 | 2.4 | 4.8 | 2.4 | 2.4 | 2.4 | 4.8 |
|  | Fluorene resin | — | — | — | — | — | — | — | — |

TABLE 3-continued

| | | | | | | | | | |
|---|---|---|---|---|---|---|---|---|---|
| Alcohol solvent | 3-methyl-1,5-pentanediol | 18 | 18 | 18 | 18 | 6 | 6 | 6 | 6 |
| | 1,6-hexanediol | — | — | — | — | — | — | — | — |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| Surfactant | | 0.1 | 0.1 | 0.1 | 0.1 | 0.1 | 0.1 | 0.1 | 0.1 |
| Pure water | | Balance | Balance | Balance | Balance | Balance | Balance | Balance | Balance |
| Balance | | 100 | 100 | 100 | 100 | 100 | 100 | 100 | 100 |

TABLE 4

| | | Example 13 Ink set 13 | | | | Example 14 Ink set 14 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
| | Urethane resin | 2.4 | 2.4 | 2.4 | 4.8 | 2.4 | 2.4 | 2.4 | 4.8 |
| | Fluorene resin | — | — | — | — | — | — | — | — |
| Alcohol solvent | 3-methyl-1,5-pentanediol | 1 | 1 | 1 | 1 | 3 | 3 | 3 | 3 |
| | 1,6-hexanediol | — | — | — | — | — | — | — | — |
| | 1,2-hexanediol | 3 | 3 | 3 | 3 | 3 | 3 | 3 | 3 |
| | 1,2-octanediol | 1 | 1 | 1 | 1 | 3 | 3 | 3 | 3 |
| Surfactant | | 0.1 | 0.1 | 0.1 | 0.1 | 0.1 | 0.1 | 0.1 | 0.1 |
| Pure water | | Balance | Balance | Balance | Balance | Balance | Balance | Balance | Balance |
| Balance | | 100 | 100 | 100 | 100 | 100 | 100 | 100 | 100 |

| | | Example 15 Ink set 15 | | | | Example 16 Ink set 16 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
| | Urethane resin | 2.4 | 2.4 | 2.4 | 4.8 | 2.4 | 2.4 | 2.4 | 4.8 |
| | Fluorene resin | — | — | — | — | — | — | — | — |
| Alcohol solvent | 3-methyl-1,5-pentanediol | 18 | 18 | 18 | 18 | 6 | 6 | 6 | 6 |
| | 1,6-hexanediol | — | — | — | — | — | — | — | — |
| | 1,2-hexanediol | 3 | 3 | 3 | 3 | 3 | 3 | 3 | 3 |
| | 1,2-octanediol | 1 | 1 | 1 | 1 | 3 | 3 | 3 | 3 |
| Surfactant | | 0.1 | 0.1 | 0.1 | 0.1 | 0.1 | 0.1 | 0.1 | 0.1 |
| Pure water | | Balance | Balance | Balance | Balance | Balance | Balance | Balance | Balance |
| Balance | | 100 | 100 | 100 | 100 | 100 | 100 | 100 | 100 |

TABLE 5

| | Composition | Example 17 Ink set 17 | | | | Example 18 Ink set 18 | | | |
|---|---|---|---|---|---|---|---|---|---|
| | | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
| | Urethane resin | — | — | — | — | — | — | — | — |
| | Fluorene resin | 2.4 | 2.4 | 2.4 | 4.8 | 2.4 | 2.4 | 2.4 | 4.8 |
| Alcohol solvent | 3-methyl-1,5-pentanediol | 1 | 1 | 1 | 1 | 3 | 3 | 3 | 3 |
| | 1,6-hexanediol | — | — | — | — | — | — | — | — |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Balance | 100 | 100 | 100 | 100 | 100 | 100 | 100 | 100 |

| | Composition | Example 19 Ink set 19 | | | | Example 20 Ink set 20 | | | |
|---|---|---|---|---|---|---|---|---|---|
| | | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
| | Urethane resin | — | — | — | — | — | — | — | — |
| | Fluorene resin | 2.4 | 2.4 | 2.4 | 4.8 | 2.4 | 2.4 | 2.4 | 4.8 |
| Alcohol solvent | 3-methyl-1,5-pentanediol | 18 | 18 | 18 | 18 | 6 | 6 | 6 | 6 |
| | 1,6-hexanediol | — | — | — | — | — | — | — | — |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Balance | 100 | 100 | 100 | 100 | 100 | 100 | 100 | 100 |

TABLE 6

| | Composition | Example 21 Ink set 21 | | | | Example 22 Ink set 22 | | | |
|---|---|---|---|---|---|---|---|---|---|
| | | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
| | Urethane resin | — | — | — | — | — | — | — | — |
| | Fluorene resin | 2.4 | 2.4 | 2.4 | 4.8 | 2.4 | 2.4 | 2.4 | 4.8 |

TABLE 6-continued

|  |  | | | | | | | | |
|---|---|---|---|---|---|---|---|---|---|
| Alcohol solvent | 3-methyl-1,5-pentanediol | 1 | 1 | 1 | 1 | 3 | 3 | 3 | 3 |
|  | 1,6-hexanediol | — | — | — | — | — | — | — | — |
|  | 1,2-hexanediol | 3 | 3 | 3 | 3 | 3 | 3 | 3 | 3 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

| | | Example 23 Ink set 23 | | | | Example 24 Ink set 24 | | | |
|---|---|---|---|---|---|---|---|---|---|
| Composition | | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 |
|  | Urethane resin | — | — | — | — | — | — | — | — |
|  | Fluorene resin | 2.4 | 2.4 | 2.4 | 4.8 | 2.4 | 2.4 | 2.4 | 4.8 |
| Alcohol solvent | 3-methyl-1,5-pentanediol | 18 | 18 | 18 | 18 | 6 | 6 | 6 | 6 |
|  | 1,6-hexanediol | — | — | — | — | — | — | — | — |
|  | 1,2-hexanediol | 3 | 3 | 3 | 3 | 3 | 3 | 3 | 3 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

TABLE 7

| | | Example 25 Ink set 25 | | | | Example 26 Ink set 26 | | | |
|---|---|---|---|---|---|---|---|---|---|
| Composition | | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | — | — | — | — | — | — | — | — |
|  | Urethane resin | 2.4 | 2.4 | 2.4 | 4.8 | 2.4 | 2.4 | 2.4 | 4.8 |
|  | Fluorene resin | 2.4 | 2.4 | 2.4 | 4.8 | 2.4 | 2.4 | 2.4 | 4.8 |
| Alcohol solvent | 3-methyl-1,5-pentanediol | 1 | 1 | 1 | 1 | 3 | 3 | 3 | 3 |
|  | 1,6-hexanediol | — | — | — | — | — | — | — | — |
|  | 1,2-hexanediol | 0.5 | 0.5 | 0.5 | 0.5 | 0.5 | 0.5 | 0.5 | 0.5 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

| | | Example 27 Ink set 27 | | | | Example 28 Ink set 28 | | | |
|---|---|---|---|---|---|---|---|---|---|
| Composition | | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |

TABLE 7-continued

|  |  |  |  |  |  |  |  |  |  |
|---|---|---|---|---|---|---|---|---|---|
| Dispersing agent | Styrene-acrylic resin | — | — | — | — | — | — | — | — |
|  | Urethane resin | 2.4 | 2.4 | 2.4 | 4.8 | 2.4 | 2.4 | 2.4 | 4.8 |
|  | Fluorene resin | 2.4 | 2.4 | 2.4 | 4.8 | 2.4 | 2.4 | 2.4 | 4.8 |
| Alcohol solvent | 3-methyl-1,5-pentanediol | 18 | 18 | 18 | 18 | 6 | 6 | 6 | 6 |
|  | 1,6-hexanediol | — | — | — | — | — | — | — | — |
|  | 1,2-hexanediol | 0.5 | 0.5 | 0.5 | 0.5 | 0.5 | 0.5 | 0.5 | 0.5 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

TABLE 8

| | | Example 29 Ink set 29 | | | | Example 30 Ink set 30 | | | |
|---|---|---|---|---|---|---|---|---|---|
| Composition | | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | — | — | — | — | — | — | — | — |
|  | Urethane resin | 2.4 | 2.4 | 2.4 | 4.8 | 2.4 | 2.4 | 2.4 | 4.8 |
|  | Fluorene resin | 2.4 | 2.4 | 2.4 | 4.8 | 2.4 | 2.4 | 2.4 | 4.8 |
| Alcohol solvent | 3-methyl-1,5-pentanediol | 1 | 1 | 1 | 1 | 3 | 3 | 3 | 3 |
|  | 1,6-hexanediol | — | — | — | — | — | — | — | — |
|  | 1,2-hexanediol | 3 | 3 | 3 | 3 | 3 | 3 | 3 | 3 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

| | | Example 31 Ink set 31 | | | | Example 32 Ink set 32 | | | |
|---|---|---|---|---|---|---|---|---|---|
| Composition | | Y | M | C | K | Y | M | C | K |
| Colorant | C.I. Pigment Yellow 74 | 12.0 | — | — | — | 12.0 | — | — | — |
|  | C.I. Pigment Red 202 | — | 12.0 | — | — | — | 12.0 | — | — |
|  | C.I. Pigment Blue 15:3 | — | — | 12.0 | — | — | — | 12.0 | — |
|  | C.I. Pigment Black 7 | — | — | — | 12.0 | — | — | — | 12.0 |
| Dispersing agent | Styrene-acrylic resin | — | — | — | — | — | — | — | — |
|  | Urethane resin | 2.4 | 2.4 | 2.4 | 4.8 | 2.4 | 2.4 | 2.4 | 4.8 |
|  | Fluorene resin | 2.4 | 2.4 | 2.4 | 4.8 | 2.4 | 2.4 | 2.4 | 4.8 |
| Alcohol solvent | 3-methyl-1,5-pentanediol | 18 | 18 | 18 | 18 | 6 | 6 | 6 | 6 |
|  | 1,6-hexanediol | — | — | — | — | — | — | — | — |
|  | 1,2-hexanediol | 3 | 3 | 3 | 3 | 3 | 3 | 3 | 3 |
|  | 1,2-octanediol | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 |
|  | Pure water | Balance | Balance | Balance | Balance | Balance | Balance | Balance | Balance |
|  | Balance | 100 | 100 | 100 | 100 | 100 | 100 | 100 | 100 |

TABLE 9

| | | Example 33 Ink set 33 | | | | Example 34 Ink set 34 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | — | — | — | — | — | — | — | — |
| | 1,6-hexanediol | 1 | 1 | 1 | 1 | 3 | 3 | 3 | 3 |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Balance | 100 | 100 | 100 | 100 | 100 | 100 | 100 | 100 |

| | | Example 35 Ink set 35 | | | | Example 36 Ink set 36 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | — | — | — | — | — | — | — | — |
| | 1,6-hexanediol | 18 | 18 | 18 | 18 | 6 | 6 | 6 | 6 |
| | 1,2-hexanediol | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Balance | 100 | 100 | 100 | 100 | 100 | 100 | 100 | 100 |

TABLE 10

| | | Example 37 Ink set 37 | | | | Example 38 Ink set 38 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |

TABLE 10-continued

| | | | | | | | | | |
|---|---|---|---|---|---|---|---|---|---|
| Alcohol solvent | 3-methyl-1,5-pentanediol | — | — | — | — | — | — | — | — |
| | 1,6-hexanediol | 1 | 1 | 1 | 1 | 3 | 3 | 3 | 3 |
| | 1,2-hexanediol | 3 | 3 | 3 | 3 | 3 | 3 | 3 | 3 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Balance | 100 | 100 | 100 | 100 | 100 | 100 | 100 | 100 |

| | | Example 39 Ink set 39 | | | | Example 40 Ink set 40 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | — | — | — | — | — | — | — | — |
| | 1,6-hexanediol | 18 | 18 | 18 | 18 | 6 | 6 | 6 | 6 |
| | 1,2-hexanediol | 3 | 3 | 3 | 3 | 3 | 3 | 3 | 3 |
| | 1,2-octanediol | 1 | 1 | 1 | 1 | 3 | 3 | 3 | 3 |
| | Surfactant | 0.1 | 0.1 | 0.1 | 0.1 | 0.1 | 0.1 | 0.1 | 0.1 |
| | Pure water | Balance | Balance | Balance | Balance | Balance | Balance | Balance | Balance |
| | Balance | 100 | 100 | 100 | 100 | 100 | 100 | 100 | 100 |

TABLE 11

| | | Example 41 Ink set 41 | | | | Example 42 Ink set 42 | | | | Example 43 Ink set 43 | | | | Example 44 Ink set 44 | | | |
|---|---|---|---|---|---|---|---|---|---|---|---|---|---|---|---|---|---|
| | Composition | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
| | C.I. Pigment Red 202 | — | 12.0 | — | — | — | 12.0 | — | — | — | 12.0 | — | — | — | 12.0 | — | — |
| | C.I. Pigment Blue 15:3 | — | — | 12.0 | — | — | — | 12.0 | — | — | — | 12.0 | — | — | — | 12.0 | — |
| | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| | Urethane resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| | Fluorene resin | — | — | — | — | — | — | — | — | — | — | — | — | — | — | — | — |
| Alcohol solvent | 3-methyl-1,5-pentanediol | — | — | — | — | — | — | — | — | — | — | — | — | — | — | — | — |
| | 1,6-hexanediol | 1 | 1 | 1 | 1 | 3 | 3 | 3 | 3 | 18 | 18 | 18 | 18 | 6 | 6 | 6 | 6 |
| | 1,2-hexanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 1,2-octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |

TABLE 12

| Composition | | Example 45 Ink set 45 | | | | Example 46 Ink set 46 | | | | Example 47 Ink set 47 | | | | Example 48 Ink set 48 | | | |
|---|---|---|---|---|---|---|---|---|---|---|---|---|---|---|---|---|---|
| | | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
| | C.I. Pigment Red 202 | — | 12.0 | — | — | — | 12.0 | — | — | — | 12.0 | — | — | — | 12.0 | — | — |
| | C.I. Pigment Blue 15:3 | — | — | 12.0 | — | — | — | 12.0 | — | — | — | 12.0 | — | — | — | 12.0 | — |
| | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| | Urethane resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| | Fluorene resin | — | — | — | — | — | — | — | — | — | — | — | — | — | — | — | — |
| Alcohol solvent | 3-methyl-1,5-pentanediol | — | — | — | — | — | — | — | — | — | — | — | — | — | — | — | — |
| | 1,6-hexanediol | 1 | 1 | 1 | 1 | 3 | 3 | 3 | 3 | 18 | 18 | 18 | 18 | 6 | 6 | 6 | 6 |
| | 1,2-hexanediol | 3 | 3 | 3 | 3 | 3 | 3 | 3 | 3 | 3 | 3 | 3 | 3 | 3 | 3 | 3 | 3 |
| | 1,2-octanediol | 1 | 1 | 1 | 1 | 1 | 1 | 1 | 1 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |

TABLE 13

| Composition | | Example 49 Ink set 49 | | | | Example 50 Ink set 50 | | | | Example 51 Ink set 51 | | | | Example 52 Ink set 52 | | | |
|---|---|---|---|---|---|---|---|---|---|---|---|---|---|---|---|---|---|
| | | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
| | C.I. Pigment Red 202 | — | 12.0 | — | — | — | 12.0 | — | — | — | 12.0 | — | — | — | 12.0 | — | — |
| | C.I. Pigment Blue 15:3 | — | — | 12.0 | — | — | — | 12.0 | — | — | — | 12.0 | — | — | — | 12.0 | — |
| | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| | Urethane resin | — | — | — | — | — | — | — | — | — | — | — | — | — | — | — | — |
| | Fluorene resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| Alcohol solvent | 3-methyl-1,5-pentanediol | — | — | — | — | — | — | — | — | — | — | — | — | — | — | — | — |
| | 1,6-hexanediol | 1 | 1 | 1 | 1 | 3 | 3 | 3 | 3 | 18 | 18 | 18 | 18 | 6 | 6 | 6 | 6 |
| | 1,2-hexanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 1,2-octanediol | 1 | 1 | 1 | 1 | 1 | 1 | 1 | 1 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Balance | Balance | Balance | Balance | Balance | Balance | Balance | Balance | Balance | Balance | Balance | Balance | Balance | Balance | Balance | Balance |
| | Balance | 100 | 100 | 100 | 100 | 100 | 100 | 100 | 100 | 100 | 100 | 100 | 100 | 100 | 100 | 100 | 100 |

TABLE 14

| Composition | | Example 53 Ink set 53 | | | | Example 54 Ink set 54 | | | | Example 55 Ink set 55 | | | | Example 56 Ink set 56 | | | |
|---|---|---|---|---|---|---|---|---|---|---|---|---|---|---|---|---|---|
| | | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
| | C.I. Pigment Red 202 | — | 12.0 | — | — | — | 12.0 | — | — | — | 12.0 | — | — | — | 12.0 | — | — |
| | C.I. Pigment Blue 15:3 | — | — | 12.0 | — | — | — | 12.0 | — | — | — | 12.0 | — | — | — | 12.0 | — |
| | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| | Urethane resin | — | — | — | — | — | — | — | — | — | — | — | — | — | — | — | — |
| | Fluorene resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |

TABLE 14-continued

|  |  | Example 53 Ink set 53 | | | | Example 54 Ink set 54 | | | | Example 55 Ink set 55 | | | | Example 56 Ink set 56 | | | |
|---|---|---|---|---|---|---|---|---|---|---|---|---|---|---|---|---|---|
| Composition | | Y | M | C | K | Y | M | C | K | Y | M | C | K | Y | M | C | K |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 3 | 3 | 3 | 3 | 3 | 3 | 3 | 3 | 3 | 3 | 3 | 3 | 3 | 3 | 3 | 3 |
|  | 1,2-octanediol | 1 | 1 | 1 | 1 | 3 | 3 | 3 | 3 | 1 | 1 | 1 | 1 | 3 | 3 | 3 | 3 |
| Surfactant | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pure water | | Balance | Balance | Balance | Balance | Balance | Balance | Balance | Balance | Balance | Balance | Balance | Balance | Balance | Balance | Balance | Balance |
| Balance | | 100 | 100 | 100 | 100 | 100 | 100 | 100 | 100 | 100 | 100 | 100 | 100 | 100 | 100 | 100 | 100 |

TABLE 15

|  |  | Example 57 Ink set 57 | | | | Example 58 Ink set 58 | | | | Example 59 Ink set 59 | | | | Example 60 Ink set 60 | | | |
|---|---|---|---|---|---|---|---|---|---|---|---|---|---|---|---|---|---|
| Composition | | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |
| Dispersing agent | Styrene-acrylic resin | — | — | — | — | — | — | — | — | — | — | — | — | — | — | — | — |
|  | Urethane resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Fluorene resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
|  | 1,2-octanediol | 1 | 1 | 1 | 1 | 3 | 3 | 3 | 3 | 1 | 1 | 1 | 1 | 3 | 3 | 3 | 3 |
| Surfactant | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pure water | | Balance | Balance | Balance | Balance | Balance | Balance | Balance | Balance | Balance | Balance | Balance | Balance | Balance | Balance | Balance | Balance |
| Balance | | 100 | 100 | 100 | 100 | 100 | 100 | 100 | 100 | 100 | 100 | 100 | 100 | 100 | 100 | 100 | 100 |

TABLE 16

|  |  | Example 61 Ink set 61 | | | | Example 62 Ink set 62 | | | | Example 63 Ink set 63 | | | | Example 64 Ink set 64 | | | |
|---|---|---|---|---|---|---|---|---|---|---|---|---|---|---|---|---|---|
| Composition | | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |
| Dispersing agent | Styrene-acrylic resin | — | — | — | — | — | — | — | — | — | — | — | — | — | — | — | — |
|  | Urethane resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Fluorene resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 3 | 3 | 3 | 3 | 3 | 3 | 3 | 3 | 3 | 3 | 3 | 3 | 3 | 3 | 3 | 3 |
|  | 1,2-octanediol | 1 | 1 | 1 | 1 | 3 | 3 | 3 | 3 | 1 | 1 | 1 | 1 | 3 | 3 | 3 | 3 |
| Surfactant | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pure water | | Balance | Balance | Balance | Balance | Balance | Balance | Balance | Balance | Balance | Balance | Balance | Balance | Balance | Balance | Balance | Balance |
| Balance | | 100 | 100 | 100 | 100 | 100 | 100 | 100 | 100 | 100 | 100 | 100 | 100 | 100 | 100 | 100 | 100 |

TABLE 17

|  | Composition | Example 65 Ink set 65 | | | | Example 66 Ink set 66 | | | | Example 67 Ink set 67 | | | | Example 68 Ink set 68 | | | |
|---|---|---|---|---|---|---|---|---|---|---|---|---|---|---|---|---|---|
|  |  | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Urethane resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Fluorene resin | — | — | — | — | — | — | — | — | — | — | — | — | — | — | — | — |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
|  | 1,2-octanediol | 1 | 1 | 1 | 1 | 3 | 3 | 3 | 3 | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Pure water | Balance | Balance | Balance | Balance | Balance | Balance | Balance | Balance | Balance | Balance | Balance | Balance | Balance | Balance | Balance | Balance |
|  | Balance | 100 | 100 | 100 | 100 | 100 | 100 | 100 | 100 | 100 | 100 | 100 | 100 | 100 | 100 | 100 | 100 |

TABLE 18

|  | Composition | Example 69 Ink set 69 | | | | Example 70 Ink set 70 | | | | Example 71 Ink set 71 | | | | Example 72 Ink set 72 | | | |
|---|---|---|---|---|---|---|---|---|---|---|---|---|---|---|---|---|---|
|  |  | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Urethane resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Fluorene resin | — | — | — | — | — | — | — | — | — | — | — | — | — | — | — | — |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 3 | 3 | 3 | 3 | 3 | 3 | 3 | 3 | 3 | 3 | 3 | 3 | 3 | 3 | 3 | 3 |
|  | 1,2-octanediol | 1 | 1 | 1 | 1 | 3 | 3 | 3 | 3 | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Pure water | Balance | Balance | Balance | Balance | Balance | Balance | Balance | Balance | Balance | Balance | Balance | Balance | Balance | Balance | Balance | Balance |
|  | Balance | 100 | 100 | 100 | 100 | 100 | 100 | 100 | 100 | 100 | 100 | 100 | 100 | 100 | 100 | 100 | 100 |

TABLE 19

|  | Composition | Example 73 Ink set 73 | | | | Example 74 Ink set 74 | | | | Example 75 Ink set 75 | | | | Example 76 Ink set 76 | | | |
|---|---|---|---|---|---|---|---|---|---|---|---|---|---|---|---|---|---|
|  |  | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |

TABLE 19-continued

|  |  | Example 73 Ink set 73 | | | | Example 74 Ink set 74 | | | | Example 75 Ink set 75 | | | | Example 76 Ink set 76 | | | |
| --- | --- | --- | --- | --- | --- | --- | --- | --- | --- | --- | --- | --- | --- | --- | --- | --- | --- |
|  | Composition | Y | M | C | K | Y | M | C | K | Y | M | C | K | Y | M | C | K |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Urethane resin | — | — | — | — | — | — | — | — | — | — | — | — | — | — | — | — |
|  | Fluorene resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
|  | 1,2-octanediol | 1 | 1 | 1 | 1 | 3 | 3 | 3 | 3 | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Pure water | Balance | Balance | Balance | Balance | Balance | Balance | Balance | Balance | Balance | Balance | Balance | Balance | Balance | Balance | Balance | Balance |
|  | Balance | 100 | 100 | 100 | 100 | 100 | 100 | 100 | 100 | 100 | 100 | 100 | 100 | 100 | 100 | 100 | 100 |

TABLE 20

|  |  | Example 77 Ink set 77 | | | | Example 78 Ink set 78 | | | | Example 79 Ink set 79 | | | | Example 80 Ink set 80 | | | |
| --- | --- | --- | --- | --- | --- | --- | --- | --- | --- | --- | --- | --- | --- | --- | --- | --- | --- |
|  | Composition | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |
| Dispersing agent | Styrene-acrylic resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
|  | Urethane resin | — | — | — | — | — | — | — | — | — | — | — | — | — | — | — | — |
|  | Fluorene resin | 2.4 | 2.4 | 2.4 | 4.8 | 2.4 | 2.4 | 2.4 | 4.8 | 2.4 | 2.4 | 2.4 | 4.8 | 2.4 | 2.4 | 2.4 | 4.8 |
| Alcohol solvent | 3-methyl-1,5-pentanediol | — | — | — | — | — | — | — | — | — | — | — | — | — | — | — | — |
|  | 1,6-hexanediol | 1 | 1 | 1 | 1 | 3 | 3 | 3 | 3 | 18 | 18 | 18 | 18 | 6 | 6 | 6 | 6 |
|  | 1,2-hexanediol | 3 | 3 | 3 | 3 | 3 | 3 | 3 | 3 | 3 | 3 | 3 | 3 | 3 | 3 | 3 | 3 |
|  | 1,2-octanediol | 1 | 1 | 1 | 1 | 3 | 3 | 3 | 3 | 1 | 1 | 1 | 1 | 3 | 3 | 3 | 3 |
|  | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | Pure water | Balance | Balance | Balance | Balance | Balance | Balance | Balance | Balance | Balance | Balance | Balance | Balance | Balance | Balance | Balance | Balance |
|  | Balance | 100 | 100 | 100 | 100 | 100 | 100 | 100 | 100 | 100 | 100 | 100 | 100 | 100 | 100 | 100 | 100 |

TABLE 21

|  |  | Comparative Example 1 Ink set 1 | | | | Comparative Example 2 Ink set 2 | | | | Comparative Example 3 Ink set 3 | | | | Comparative Example 4 Ink set 4 | | | |
| --- | --- | --- | --- | --- | --- | --- | --- | --- | --- | --- | --- | --- | --- | --- | --- | --- | --- |
|  | Composition | Y | M | C | K | Y | M | C | K | Y | M | C | K | Y | M | C | K |
| Colorant | C.I. Pigment Yellow 74 | 12.0 | — | — | — | 12.0 | — | — | — | 12.0 | — | — | — | 12.0 | — | — | — |
|  | C.I. Pigment Red 202 | — | 12.0 | — | — | — | 12.0 | — | — | — | 12.0 | — | — | — | 12.0 | — | — |
|  | C.I. Pigment Blue 15:3 | — | — | 12.0 | — | — | — | 12.0 | — | — | — | 12.0 | — | — | — | 12.0 | — |
|  | C.I. Pigment Black 7 | — | — | — | 12.0 | — | — | — | 12.0 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 | 4.8 | 4.8 | 4.8 | 9.6 | 4.8 | 4.8 | 4.8 | 9.6 |
|  | Urethane resin | — | — | — | — | — | — | — | — | — | — | — | — | — | — | — | — |
|  | Fluorene resin | — | — | — | — | — | — | — | — | — | — | — | — | — | — | — | — |

TABLE 21-continued

|  |  | Comparative Example 1 Ink set 1 | | | | Comparative Example 2 Ink set 2 | | | | Comparative Example 3 Ink set 3 | | | | Comparative Example 4 Ink set 4 | | | |
|---|---|---|---|---|---|---|---|---|---|---|---|---|---|---|---|---|---|
| | Composition | Y | M | C | K | Y | M | C | K | Y | M | C | K | Y | M | C | K |
| Alcohol solvent | 3-methyl-1,5-pentanediol | 6 | 6 | 6 | 6 | — | — | — | — | 6 | 6 | 6 | 6 | — | — | — | — |
| | 1,6-hexanediol | — | — | — | — | — | — | — | — | — | — | — | — | — | — | — | — |
| | 1,2-hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-octanediol | — | — | — | — | 3 | 3 | 3 | 3 | — | — | — | — | 3 | 3 | 3 | 3 |
| Surfactant | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pure water | | Balance | Balance | Balance | Balance | Balance | Balance | Balance | Balance | Balance | Balance | Balance | Balance | Balance | Balance | Balance | Balance |
| Balance | | 100 | 100 | 100 | 100 | 100 | 100 | 100 | 100 | 100 | 100 | 100 | 100 | 100 | 100 | 100 | 100 |

TABLE 22

|  |  | Comparative Example 5 Ink set 5 | | | | Comparative Example 6 Ink set 6 | | | |
|---|---|---|---|---|---|---|---|---|---|
| | Composition | Y | M | C | K | Y | M | C | K |
| Colorant | C.I. Pigment Yellow 74 | 12.0 | — | — | — | 12.0 | — | — | — |
| | C.I. Pigment Red 202 | — | 12.0 | — | — | — | 12.0 | — | — |
| | C.I. Pigment Blue 15:3 | — | — | 12.0 | — | — | — | 12.0 | — |
| | C.I. Pigment Black 7 | — | — | — | 12.0 | — | — | — | 12.0 |
| Dispersing agent | Styrene-acrylic resin | 4.8 | 4.8 | 4.8 | 9.6 | 4.8 | 4.8 | 4.8 | 9.6 |
| | Urethane resin | — | — | — | — | — | — | — | — |
| | Fluorene resin | — | — | — | — | — | — | — | — |
| Alcohol solvent | 3-methyl-1,5-pentanediol | 18 | 18 | 18 | 18 | — | — | — | — |
| | 1,6-hexanediol | — | — | — | — | — | — | — | — |
| | 1,2-hexanediol | — | — | — | — | — | — | — | — |
| | 1,2-octanediol | — | — | — | — | 3 | 3 | 3 | 3 |
| Surfactant | | 0.1 | 0.1 | 0.1 | 0.1 | 0.1 | 0.1 | 0.1 | 0.1 |
| Pure water | | Balance | Balance | Balance | Balance | Balance | Balance | Balance | Balance |
| Balance | | 100 | 100 | 100 | 100 | 100 | 100 | 100 | 100 |

Examples 80 to 160 and Comparative Examples 7 to 12

Ink sets 81 to 160 of Examples and ink sets 7 to 12 of Comparative Examples were prepared in the same way as described above except that surfactants in the ink sets of Examples 1 to 80 and the ink sets of Comparative Examples 1 to 6 were replaced by the surfactants described below.

Surfactants used in Examples 81 to 160 and Comparative Examples 7 to 12 were composed of compounds having the formula (I) in which R denotes a methyl group, a denotes an integer in the range of 6 to 10, m denotes an integer in the range of 10 to 20, and n denotes an integer in the range of 4 to 8.

Examples 161 to 240 and Comparative Examples 13 to 18

Ink sets 161 to 240 of Examples and ink sets 13 to 18 of Comparative Examples were prepared in the same way as described above except that surfactants in the ink sets of Examples 1 to 80 and the ink sets of Comparative Examples 1 to 6 were replaced by the surfactants described below.

Surfactants used in Examples 161 to 240 and Comparative Examples 13 to 18 were mixtures of a compound having the formula (I) in which R denotes a hydrogen atom, a denotes an integer in the range of 7 to 11, m denotes an integer in the range of 30 to 50, and n denotes an integer in the range of 3 to 5, a compound having the formula (I) in which R denotes a methyl group, a denotes an integer in the range of 9 to 13, m denotes an integer in the range of 2 to 4, and n denotes an integer of 1 or 2, and a compound having the formula (I) in which R denotes a methyl group, a denotes an integer in the range of 6 to 10, m denotes an integer in the range of 10 to 20, and n denotes an integer in the range of 4 to 8.

Examples 241 to 320 and Comparative Examples 19 to 24

Ink sets 241 to 320 of Examples and ink sets 19 to 24 of Comparative Examples were prepared in the same way as described above except that surfactants in the ink sets of Examples 1 to 80 and the ink sets of Comparative Examples 1 to 6 were replaced by the surfactants described below.

Surfactants used in Examples 241 to 320 and Comparative Examples 19 to 24 were composed of compounds having the formula (I) in which R denotes a methyl group, a denotes an integer in the range of 6 to 18, m is 0, and n is 1.

Evaluation

Evaluation of Uneven Aggregation of Ink and Filling-in

An ink set of Y, M, C, and K inks prepared as described above was mounted in an ink cartridge of an ink jet printer manufactured by Seiko Epson Corporation) to be ready for printing at 720 dpi in the main scanning (head moving) direction and 360 dpi in the subscanning (recording medium transport) direction. The voltage of the printer was then controlled such that the dot size of an adhering droplet was about 10 ng. A 720×360 dpi solid image was printed on about 128 g/m² OKT+ (manufactured by Oji Paper Co., Ltd.) at a single operation of 720×360 dpi. Printing was performed in a normal temperature and normal humidity environment. The quantity of adhered ink was about 2.6 mg/inch square meters. The distance between the recording paper and the print head was 3 mm.

The resulting image was evaluated on the basis of the following criteria.

A: No uneven aggregation and no white streak due to defective filling-in occur.

B: No uneven aggregation occurs, but a white streak due to defective filling-in occurs.

C: Uneven aggregation and a white streak due to defective filling-in occur.

Table 2 shows the results.

Evaluation of Initial Viscosity of Ink

The ink viscosity of the ink prepared as described above was evaluated. The viscosity of ink one hour after the preparation of the ink was measured with an oscillation viscometer (MV100 manufactured by Yamaichi Electronics Co., Ltd.) and was evaluated on the basis of the following criteria. The measurement temperature was 20° C.

A: The viscosity is more than 4 mPa·s but not more than 6 mPa·s.

B: The viscosity is more than 6 mPa·s but not more than 8 mPa·s.

C: The viscosity is more than 8 mPa·s but not more than 10 mPa·s.

Table 2 shows the evaluation results.

Evaluation of Curling

Printing was performed in the same way as described above except that about 104.7 g/m² OKT+ (manufactured by Oji Paper Co., Ltd.) was used as the recording medium. The resulting printed medium was naturally dried on a flat desk at 25° C. and 40% RH for 24 hours with the printed surface of the printed medium facing upward. The distances between the desk and the four corners of the printed medium that were warped up were measured and averaged.

A: A height below 5 mm.

B: A height of 5 mm or more but less than 10 mm.

C: A height of 10 mm or more but less than 20 mm.

D: A height of 20 mm or more.

Evaluation of Dissolution of Clogging

The ink cartridge and the ink jet printer described above were used. After an ink replacement button was pushed, printer was unplugged. In this way, after a head cap was removed, the printer was left stand at 40° C. and 15% RH for one day.

After that, all the nozzles were repeatedly cleaned until the initial discharge performance was reproduced. The ease with which clogging was dissolved was evaluated on the basis of the following criteria.

A: Clogging is dissolved after three times of cleaning.

B: Clogging is dissolved after six times of cleaning.

C: Clogging is dissolved after 12 times of cleaning.

D: Clogging is not dissolved even after 12 times of cleaning.

Table 2 shows the results.

Evaluation of Solubility of Poorly Water-Soluble Alkane Diol

An aqueous solution containing 10% by weight of 1,2-octanediol was prepared using 1,2-octanediol as a poorly water-soluble alkane diol. 1,2-octanediol was incompletely dissolved, and the aqueous solution was cloudy.

Five alcohol solvents, 1,6-hexanediol (hereinafter referred to as 1,6-HED), 3-methyl-1,5-pentanediol (hereinafter referred to as 3 MPED), 1,5-pentanediol (hereinafter referred to as 1,5-PED), 1,2-hexanediol (hereinafter referred to as HED), and 2,2'-dimethylpropanediol (hereinafter referred to as 2 MPRD) were added to 10 g of the aqueous solution until the aqueous solution became transparent.

In place of the aqueous solution described above, an aqueous solution that contains 10% by weight of 1,2-octanediol as the poorly water-soluble alkane diol and 10% by weight of 1,2-hexanediol as the water-soluble 1,2-alkane diol was prepared, and the alcohol solvents were added to the aqueous solution until the aqueous solution became transparent, as described above.

FIG. 1 shows the amounts (g) of alcohol solvents added until the aqueous solution became transparent, that is, the poorly water-soluble alkane diol was completely dissolved.

Also as apparent from FIG. 1, in the two-component aqueous alcohol solution that contains 1,2-octanediol and 1,2-hexanediol, symmetrical alkane diols having a hydroxy group at both ends, 1,6-HED, 3 MPED, 1,5-PED, and 2 MPRD have higher ability to dissolve 1,2-octanediol than the addition of HED alone.

Evaluation of Initial Fixability

The surface of the resulting printed medium was rubbed with a finger three minutes after printing. The ink fixability was evaluated on the basis of the following criteria.

A: A colorant does not become detached.

B: A colorant becomes detached.

Table 2 shows the results.

TABLE 23

| | Uneven aggregation of ink and filling-in | Initial viscosity of ink | Curling | Dissolution of clogging | Initial fixability |
|---|---|---|---|---|---|
| Example 1 | B | A | D | C | A |
| Example 2 | A | C | D | B | A |
| Example 3 | C | C | B | A | B |
| Example 4 | A | C | C | A | A |
| Example 5 | B | B | D | C | A |
| Example 6 | A | C | D | B | A |
| Example 7 | C | C | B | A | B |
| Example 8 | A | C | C | A | A |
| Example 9 | B | A | D | C | A |
| Example 10 | A | C | D | B | A |
| Example 11 | C | C | B | A | B |
| Example 12 | A | C | C | A | A |
| Example 13 | B | B | D | C | A |
| Example 14 | A | C | D | B | A |
| Example 15 | C | C | B | A | B |
| Example 16 | A | C | C | A | A |
| Example 17 | B | A | D | C | A |
| Example 18 | A | C | D | B | A |
| Example 19 | C | C | B | A | B |
| Example 20 | A | C | C | A | A |
| Example 21 | B | B | D | C | A |
| Example 22 | A | B | D | B | A |
| Example 23 | C | C | B | A | B |
| Example 24 | A | C | C | A | A |
| Example 25 | B | A | D | C | A |
| Example 26 | A | C | D | B | A |
| Example 27 | C | C | B | A | B |
| Example 28 | A | C | C | A | A |
| Example 29 | B | B | D | C | A |
| Example 30 | A | B | D | B | A |
| Example 31 | C | C | B | A | B |
| Example 32 | A | B | C | A | A |

TABLE 24

| | Uneven aggregation of ink and filling-in | Initial viscosity of ink | Curling | Dissolution of clogging | Initial fixability |
|---|---|---|---|---|---|
| Example 33 | B | A | D | B | A |
| Example 34 | A | C | D | A | A |
| Example 35 | C | C | B | A | B |
| Example 36 | A | C | C | A | A |
| Example 37 | B | B | D | C | A |
| Example 38 | A | C | D | B | A |
| Example 39 | C | C | B | A | B |
| Example 40 | A | C | C | A | A |
| Example 41 | B | A | D | B | A |
| Example 42 | A | C | D | A | A |
| Example 43 | C | C | B | A | B |
| Example 44 | A | C | C | A | A |
| Example 45 | B | B | D | C | A |
| Example 46 | A | C | D | B | A |
| Example 47 | C | C | B | A | B |
| Example 48 | A | C | C | A | A |
| Example 49 | B | A | D | B | A |
| Example 50 | A | C | D | A | A |
| Example 51 | C | C | B | A | B |
| Example 52 | A | C | C | A | A |
| Example 53 | B | B | D | C | A |
| Example 54 | A | B | D | B | A |
| Example 55 | C | C | B | A | B |
| Example 56 | A | C | C | A | A |
| Example 57 | B | A | D | B | A |
| Example 58 | A | C | D | A | A |
| Example 59 | C | C | B | A | B |
| Example 60 | A | C | C | A | A |
| Example 61 | B | B | D | C | A |
| Example 62 | A | B | D | B | A |
| Example 63 | C | C | B | A | B |
| Example 64 | A | B | C | A | A |

TABLE 25

| | Uneven aggregation of ink and filling-in | Initial viscosity of ink | Curling | Dissolution of clogging | Initial fixability |
|---|---|---|---|---|---|
| Example 65 | B | A | D | B | A |
| Example 66 | A | B | D | A | A |
| Example 67 | C | B | B | A | B |
| Example 68 | A | B | C | A | A |
| Example 69 | B | A | D | C | A |
| Example 70 | A | B | D | B | A |
| Example 71 | C | B | B | A | B |
| Example 72 | A | B | C | A | A |
| Example 73 | B | A | D | B | A |
| Example 74 | A | B | D | A | A |
| Example 75 | C | B | B | A | B |
| Example 76 | A | B | C | A | A |
| Example 77 | B | A | D | C | A |
| Example 78 | A | A | D | B | A |
| Example 79 | C | B | B | A | B |
| Example 80 | A | B | C | A | A |
| Comparative Example 1 | D | A | C | C | A |
| Comparative Example 2 | B | C | D | D | B |
| Comparative Example 3 | D | B | C | B | A |
| Comparative Example 4 | A | C | D | C | B |
| Comparative Example 5 | D | A | B | A | B |
| Comparative Example 6 | B | C | D | D | B |

Examples 81 to 160 and Comparative Examples 7 to 12 were also evaluated in the same way as described above and showed the same evaluation results as Examples 1 to 80 and Comparative Examples 1 to 6.

Examples 161 to 240 and Comparative Examples 13 to 18 were also evaluated in the same way as described above and showed the same evaluation results as Examples 1 to 80 and Comparative Examples 1 to 6.

Examples 241 to 320 and Comparative Examples 19 to 24 were also evaluated in the same way as described above and showed the same evaluation results as Examples 1 to 80 and Comparative Examples 1 to 6.

The invention claimed is:

1. An ink jet printing ink composition comprising: a colorant; water; an alcohol solvent; and a surfactant, wherein the alcohol solvent contains a poorly water-soluble alkane diol, a water-soluble 1,2-alkane diol, and a water-soluble symmetrical alkane diol having a hydroxy group at both ends.

2. The ink jet printing ink composition according to claim 1, wherein the poorly water-soluble alkane diol is an alkane diol having at least seven carbon atoms.

3. The ink jet printing ink composition according to claim 1, wherein the water-soluble 1,2-alkane diol is an alkane diol having not more than six carbon atoms.

4. The ink jet printing ink composition according to claim 1, wherein the water-soluble symmetrical alkane diol having a hydroxy group at both ends is an alkane diol having at least three carbon atoms.

5. The ink jet printing ink composition according to claim 1, wherein a ratio of a content of the poorly water-soluble alkane diol to a content of the water-soluble 1,2-alkane diol ranges from about 6:1 to about 1:3.

6. The ink jet printing ink composition according to claim 1, wherein a ratio of a content of the poorly water-soluble alkane diol to a content of the water-soluble symmetrical alkane diol having a hydroxy group at both ends ranges from about 1:1 to about 1:18.

7. The ink jet printing ink composition according to claim 1, wherein a total content of the poorly water-soluble alkane diol and the water-soluble 1,2-alkane diol is about 6% by weight or less of the ink composition.

8. The ink jet printing ink composition according to claim 1, wherein a total content of the poorly water-soluble alkane diol and the water-soluble symmetrical alkane diol having a hydroxy group at both ends is about 21% by weight or less of the ink composition.

9. The ink jet printing ink composition according to claim 1, wherein a content of the poorly water-soluble alkane diol ranges from about 1% to about 3% by weight of the ink composition.

10. The ink jet printing ink composition according to of claim 1, wherein a content of the water-soluble 1,2-alkane diol ranges from about 0.5% to about 3.0% by weight of the ink composition.

11. The ink jet printing ink composition according to claim 1, wherein a content of the water-soluble symmetrical alkane diol having a hydroxy group at both ends ranges from about 1% to about 6% by weight of the ink composition.

12. The ink jet printing ink composition according to claim 1, wherein the poorly water-soluble alkane diol is 1,2-octanediol.

13. The ink jet printing ink composition according to claim 1, wherein the water-soluble 1,2-alkane diol is one or at least two selected from the group consisting of 1,2-hexanediol, 4-methyl-1,2-pentanediol, and 3,3-dimethyl-1,2-butanediol.

14. The ink jet printing ink composition according to claim 1, wherein the water-soluble symmetrical alkane diol having a hydroxy group at both ends is a branched chain.

15. The ink jet printing ink composition according to claim 1, wherein the water-soluble symmetrical alkane diol having a hydroxy group at both ends is one or at least two selected from the group consisting of 2-methyl-1,3-propanediol, 3-methyl-1,5-pentanediol, 1,5-pentanediol, and 1,6-hexanediol.

16. The ink jet printing ink composition according to claim 1, wherein a content of the surfactant ranges from about 0.01% to about 1.0% by weight of the ink composition.

17. The ink jet printing ink composition according to claim 1, wherein the surfactant is a polyorganosiloxane surfactant.

18. The ink jet printing ink composition according to claim 1, wherein the water-soluble 1,2-alkane diol and the water-soluble symmetrical alkane diol having a hydroxy group at both ends have water solubilities of at least 10.0 g of solute per 100 g of water at 20° C.

19. An ink jet printing ink composition comprising: a colorant; water; an alcohol solvent; and a surfactant, wherein the alcohol solvent contains a poorly water-soluble alkane diol, a water-soluble 1,2-alkane diol, and a water-soluble symmetrical alkane diol having a hydroxy group at both ends, wherein a ratio of a content of the water-soluble 1,2-alkane diol to a content of the water-soluble symmetrical alkane diol having a hydroxy group at both ends ranges from about 1:2 to about 1:12.

* * * * *